United States Patent [19]
Mack et al.

[11] Patent Number: 5,927,914
[45] Date of Patent: Jul. 27, 1999

[54] COMPACT CHUCK ASSEMBLY FOR A POWER DRILL

[75] Inventors: Hans-Dieter Mack; Günter Horst Röhm, both of Sontheim, Germany

[73] Assignee: Gunter Horst Rohm, Sontheim, Germany

[21] Appl. No.: 09/092,783

[22] Filed: Jun. 5, 1998

Related U.S. Application Data

[63] Continuation of application No. 08/606,996, Feb. 26, 1996, Pat. No. 5,882,153.

[30] Foreign Application Priority Data

Feb. 25, 1995 [DE] Germany .............................. 195 06 708
Jun. 23, 1995 [EP] European Pat. Off. .............. 95109792

[51] Int. Cl.[6] ................................................... B23B 31/02
[52] U.S. Cl. ............................... 408/240; 279/60; 279/62
[58] Field of Search ........................... 408/240; 279/902, 279/19, 62, 61, 60, 125; 173/48

[56] References Cited

U.S. PATENT DOCUMENTS

| | | | |
|---|---|---|---|
| 896,051 | 8/1908 | Ashey | 279/62 |
| 1,053,530 | 2/1913 | North | 279/62 |
| 3,000,642 | 9/1961 | Kawasaki | 279/62 |
| 4,775,159 | 10/1988 | Manschitz | 279/62 X |
| 5,072,954 | 12/1991 | Mack | 279/60 |
| 5,232,230 | 8/1993 | Lin | 279/62 |

*Primary Examiner*—Andrea L. Pitts
*Assistant Examiner*—Henry W. H. Tsai
*Attorney, Agent, or Firm*—Herbert Dubno; Andrew Wilford

[57] ABSTRACT

A chuck has a chuck body formed centered on an axis with a rearwardly open hole adapted to receive a drill spindle and with a plurality of axially forwardly and axially rearwardly open guide passages, an adjustment ring axially fixed but rotatable about the axis on the chuck body and formed with an internal screwthread, and respective jaws displaceable in the passages between axially front and radially closely spaced positions and axially back and radially widely spaced positions and having teeth meshing with the screwthread. The jaws project in the back positions rearward from the chuck body axially rearward past the hole receiving the spindle so that rotation of the ring in a forward direction on the chuck body displaces the jaws axially forward and radially inward and opposite rotation of the ring in a reverse direction on the chuck body displaces the jaws axially rearward and radially apart.

16 Claims, 19 Drawing Sheets

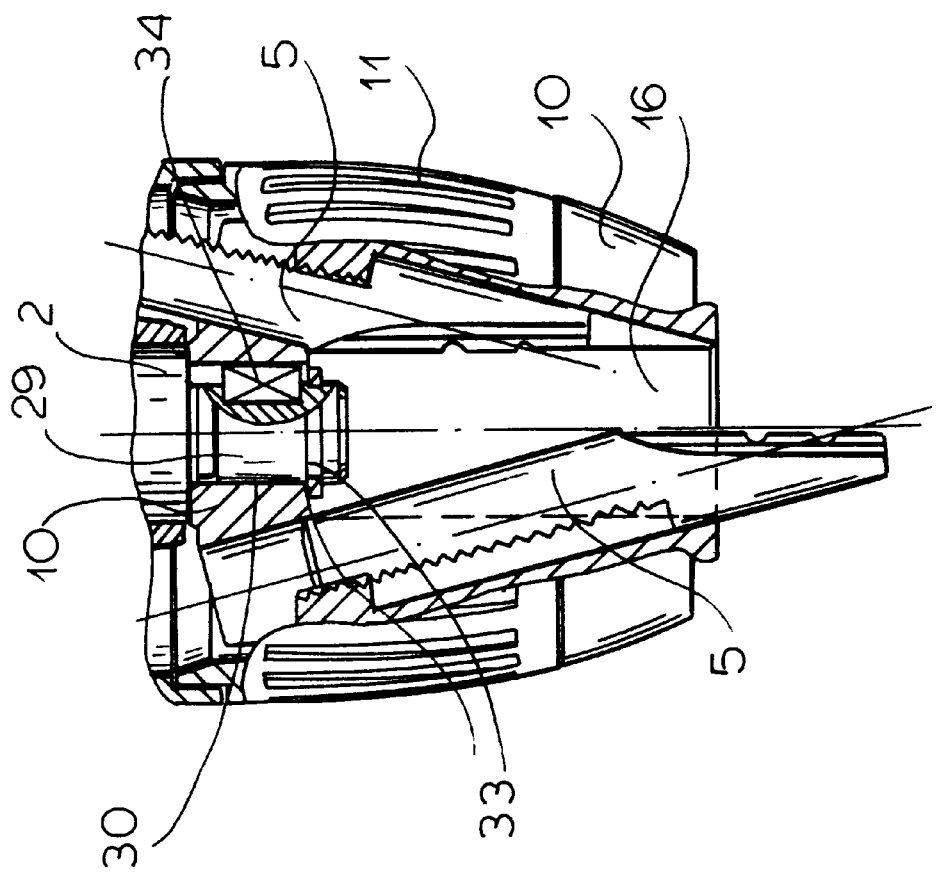
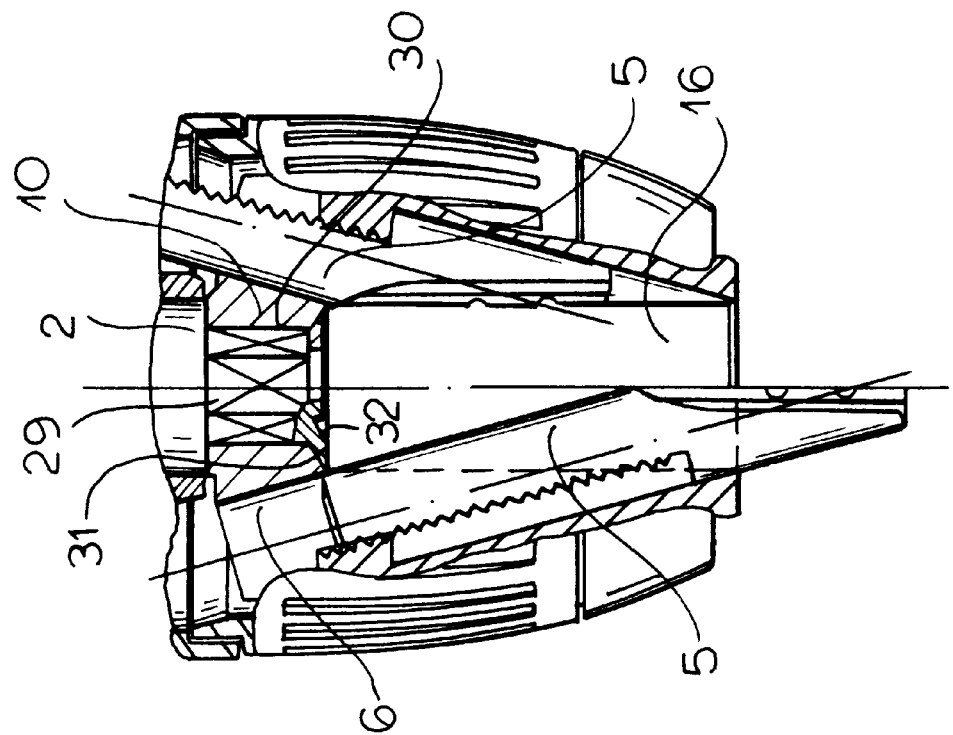

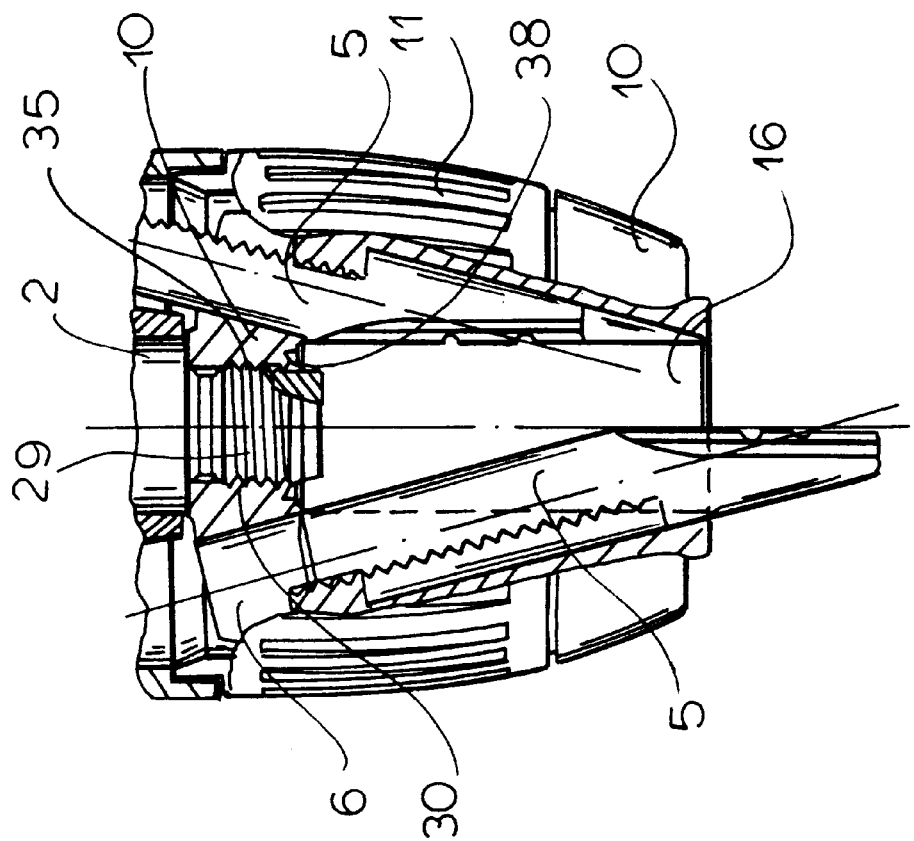
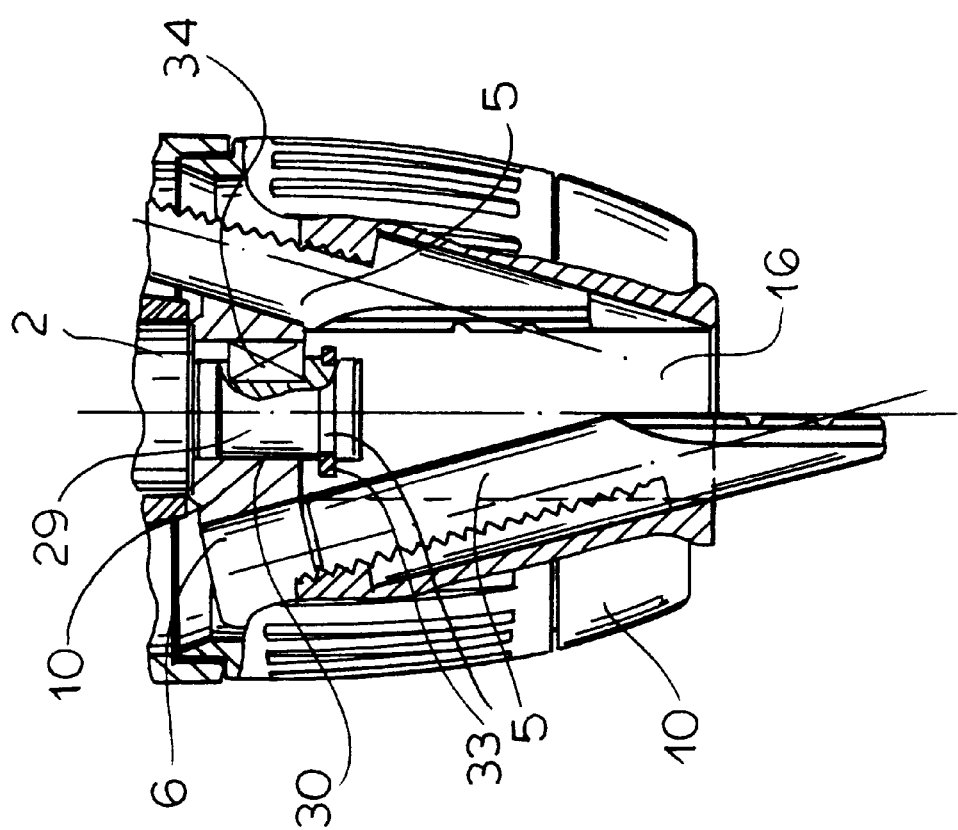

COMPACT CHUCK ASSEMBLY FOR A POWER DRILL

CROSS REFERENCE TO RELATED APPLICATIONS

This application is a continuation of patent application Ser. No. 08/606,996 filed Feb. 26, 1996, now U.S. Pat. No. 5,882,153 with a claim to the priority of German application 195 06 708.8 filed Feb. 25, 1995 and European application 95 109 792.2 filed Jun. 23, 1995.

FIELD OF THE INVENTION

The present invention relates to a drill chuck. More particularly this invention concerns a power drill and a chuck assembly for it.

BACKGROUND OF THE INVENTION

A standard drill has a drill housing and a drive spindle centered on and rotatable about an axis, projecting axially outward from the housing, and having an outer end. A chuck element is fixed on the spindle outer end and an adjustment ring element is axially fixed but rotatable about the axis on the chuck element. One of the elements is formed with a plurality of axially forwardly open guide passages open axially rearward into the chamber and the other of the elements is formed with a screw-thread centered on the axis. The elements are both rotatable about the axis relative to the formation. Respective jaws are displaceable in the passages between axially front and radially closely spaced positions and axially back and radially widely spaced positions and have teeth meshing with the screwthread. Thus rotation of the ring element in a forward direction on the chuck element displaces the jaws axially forward and radially inward and opposite rotation of the ring element in a reverse direction on the chuck element displaces the jaws axially rear-ward and radially apart.

The main problem with this type of drill and chuck assembly, which is described in my U.S. Pat. Nos. 4,836,563 and 5,378,002 and in my German patent 3,437,792 is that the overall length of the chuck assembly is excessive. In order to accommodate the axial travel of the jaws, it is necessary to make the chuck fairly long which makes the drill harder to handle while adding nothing to its functionality. Since the chuck itself is normally a standard item that is installed on the drill body, there is little interrelationship between the two parts, that is one is not designed to go particularly with the other.

OBJECTS OF THE INVENTION

It is therefore an object of the present invention to provide an improved power drill.

Another object is the provision of such an improved power drill which overcomes the above-given disadvantages, that is which has a more compact chuck assembly whose functioning is better integrated with that of the drill body.

SUMMARY OF THE INVENTION

A chuck has according to the invention a chuck body formed centered on an axis with a rearwardly open hole adapted to receive a drill spindle and with a plurality of axially forwardly and axially rearwardly open guide passages, an adjustment ring axially fixed but rotatable about the axis on the chuck body and formed with an internal screwthread, and respective jaws displaceable in the passages between axially front and radially closely spaced positions and axially back and radially widely spaced positions and having teeth meshing with the screwthread. The jaws project in the back positions rearward from the chuck body axially rearward past the hole receiving the spindle so that rotation of the ring in a forward direction on the chuck body displaces the jaws axially forward and radially inward and opposite rotation of the ring in a reverse direction on the chuck body displaces the jaws axially rearward and radially apart.

This construction allows the chuck to be made extremely short, measured parallel to its rotation axis, so that the overall drill in which it is incorporated can also be quite short. The advantages of this construction are obvious in that the tool can be used in tighter locations and more easily stored and transported while at the same time the drill has all the functionality of longer models.

The hole according to the invention is axially level with the passages. In addition the hole extends axially forward of the adjustment ring. The screwthread of the ring engages the teeth of the jaws axially rearward of a rear face of the chuck body and the ring is formed with an annular and radially inwardly open groove and the body with an annular and radially outwardly projecting ridge fitted in the groove.

Another chuck according to the invention has a similar construction but a formation forms an annular chamber around a rear end of the chuck element. The jaws project rearward from the one element into the chamber in the back positions.

The housing is provided with a bearing rotatably supporting the spindle and projecting from the housing. The chamber radially surrounds the bearing and is radially outwardly closed by the formation. The spindle and chuck element are unitary with each other and the chuck element has a seat in which the spindle outer end is seated. Both the outer end and seat have complementary noncylindrical shapes. The chuck element is formed between the jaws with an axially forwardly open tool-receiving recess and the spindle outer end engages into the recess. In addition the spindle outer end and chuck element have interengaging formations that angularly couple them together.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 6a through 6f are detail views of variants on the chuck;

SPECIFIC DESCRIPTION

Figure 1:
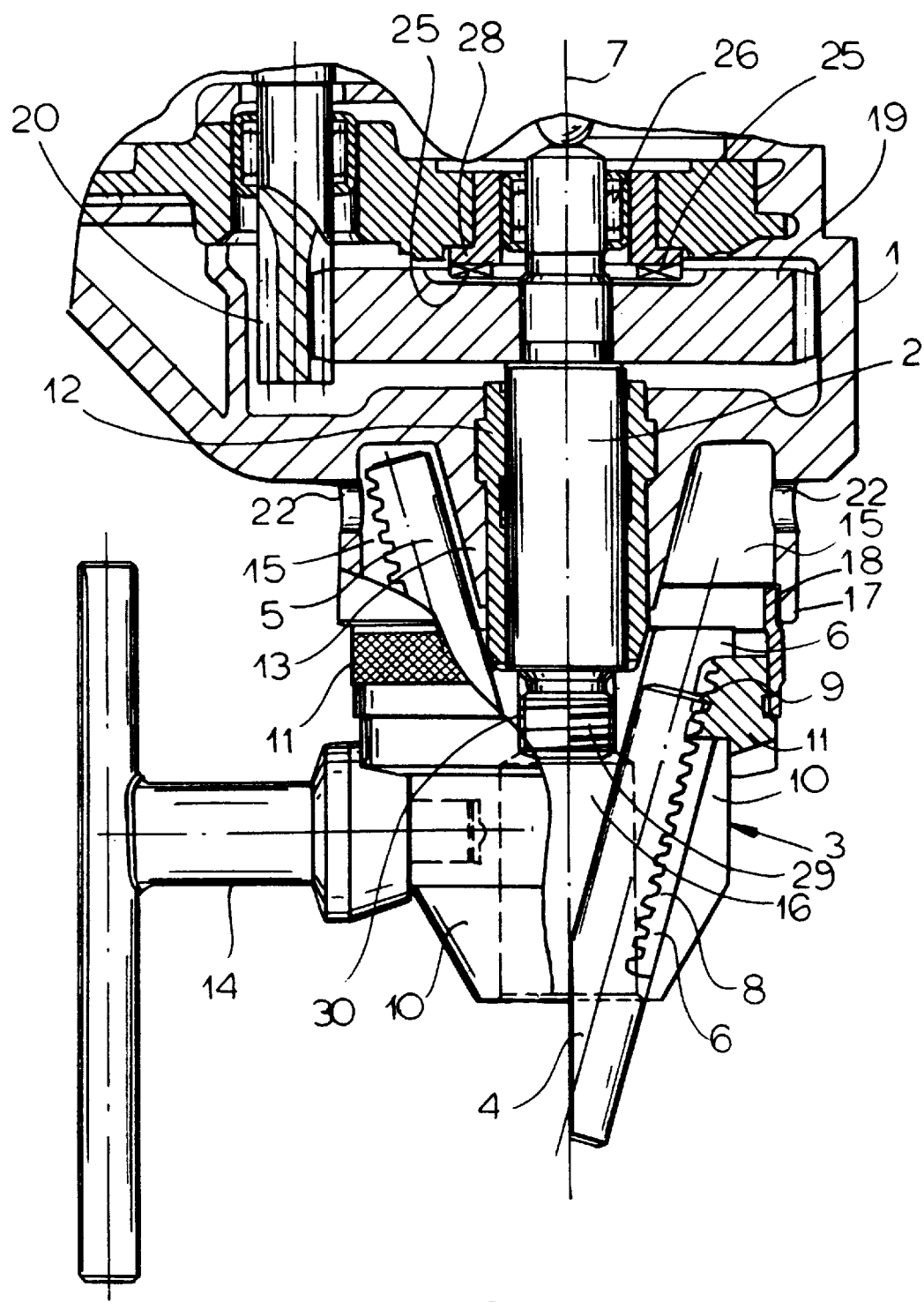
FIG. 1 is an axial section through a drill chuck according to the invention.

As seen in FIG. 1 a power drill according to the invention has a housing 1 from which projects a drill spindle 2 along an axis 7. A journal 12 supports the shaft 2 for rotation about the axis 7 and inside the housing 1 the spindle 2 is fixed on a large-diameter gear 19 meshing with a small-diameter drive pinion 20 driven directly by an unillustrated electric motor. The spindle 2 has a threaded outer end 29 seated in a threaded bore 30 of a chuck 3 having a body 10 formed with three angled guide passages 6 each holding a respective jaw 4. An adjustment or tightening ring 11 is rotatable but axially fixed on the body 10 and has an internal screwthread 9 meshing with rows of teeth 8 on the outer edges of the jaws 4. Thus rotation of the ring 11 on the chuck body 10 in one direction advances the jaws to a front position shown to the right in FIG. 1 and opposite rotation pulls them back to a back position shown to the left in FIG. 1. In the back position rear ends 5 of the jaws 4 project axially rearward out of the guides 6 and a relatively thick tool can be held in a forwardly open tool recess 16 defined by the jaws 4. A key 14 can be fitted into a hole in the body 10 to mesh with teeth formed on the ring 11 to operate the chuck. Alternately as is well known in the art, the guides 6 could be formed in the ring 11 and the screwthread 9 on the body 10 for similar operation.

The housing 1 is formed centered on the axis 7 with an inner collar 13 holding the journal bearing 12 and with a cylindrical outer collar 17 defining an annular space or chamber 15 into which the jaw ends 5 engage in the back positions. Radially throughgoing holes 22 allow chips or the like to exit from the chamber 15, but otherwise the jaw ends 5 are contained and protected therein. A rearwardly extending projection of the ring 11 axially overlaps the front or outer end of the collar 17 at 18 for a relatively close fit.

For hammer drilling a profile collar or washer 25 is provided surrounding the spindle 2. The rear end of the spindle 2 is held in a needle bearing 26 which is received in a bearing sleeve 27 in the housing 1. A flange 28 of the sleeve 27 lies between the impact collar 25 and the housing 1.

Figure 2:
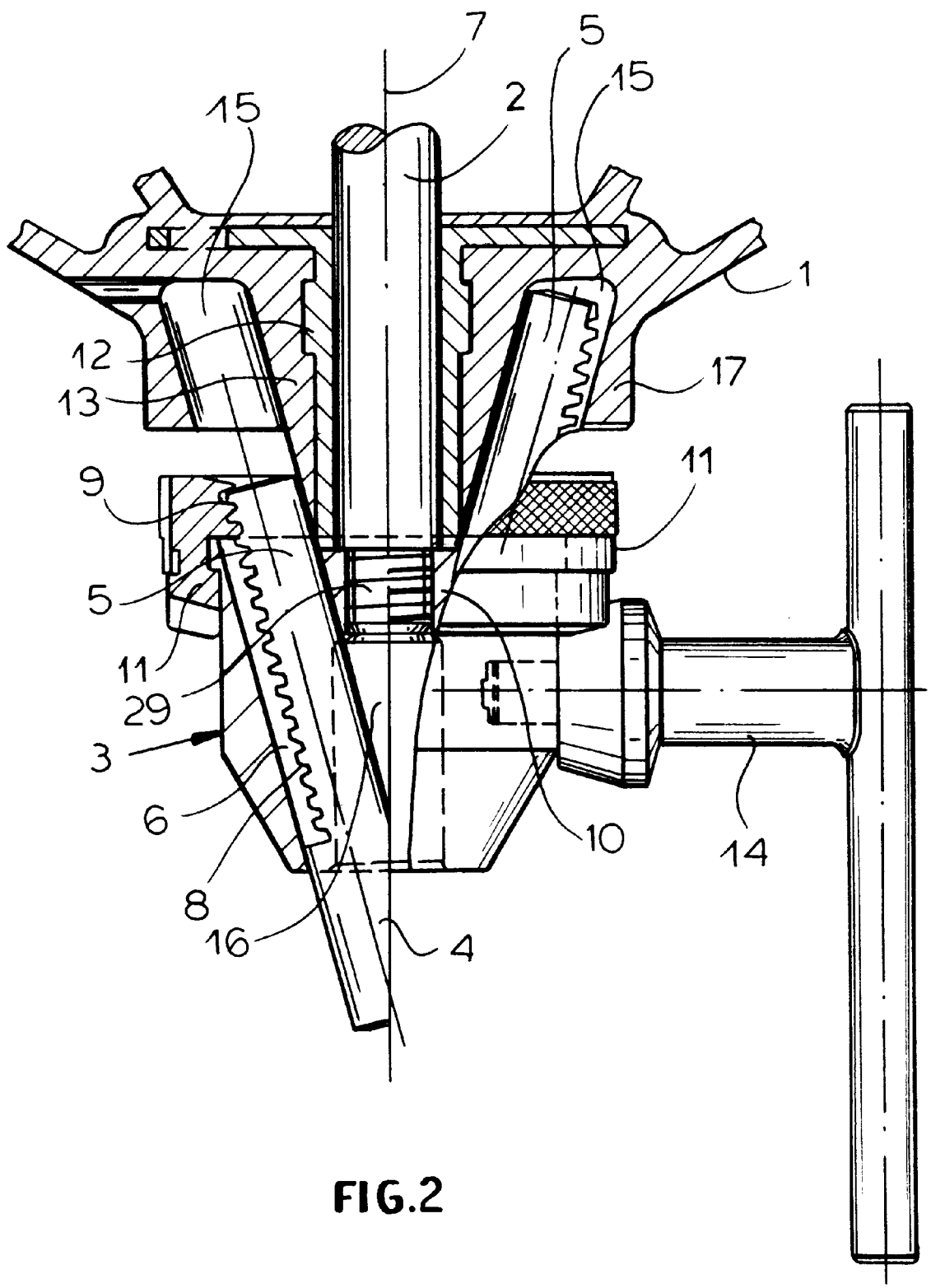
FIGS. 2, 3, 4, and 5 are views like FIG. 1 of other chucks in accordance with this invention.

FIG. 2 shows an arrangement with a gap between the front end of the collar or rim 17 forming the chamber 15 and the rear end of the chuck 3. Nonetheless here as shown to the right the rear ends 5 of the jaws 4 project into the chamber when in the back positions.

Figure 3:
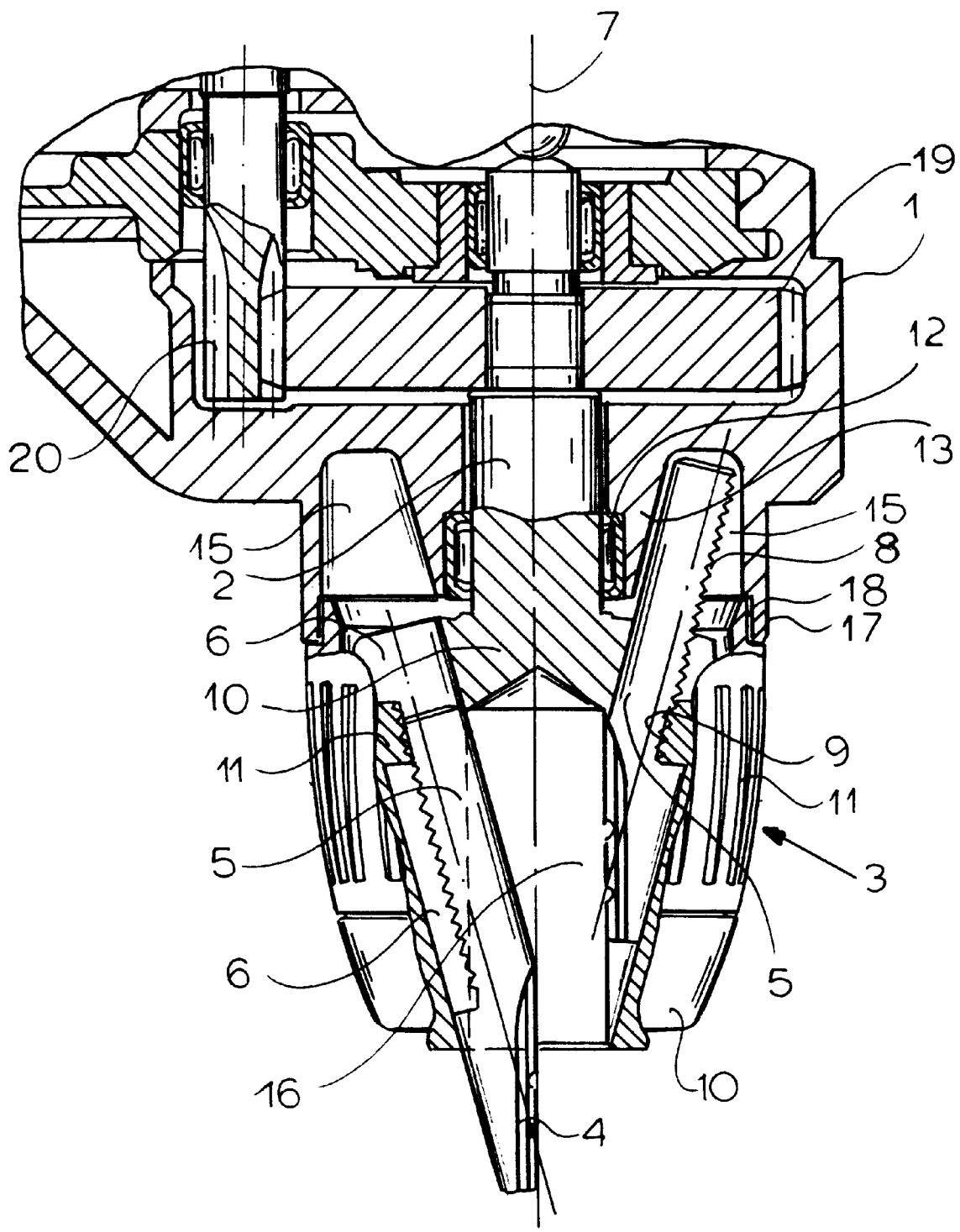

The chuck of FIG. 3 has a needle bearing 12 instead of a sleeve bearing. In addition this system does not use an adjustment key 14. Furthermore the spindle 2 is unitary with the chuck body 10.

Figure 4:
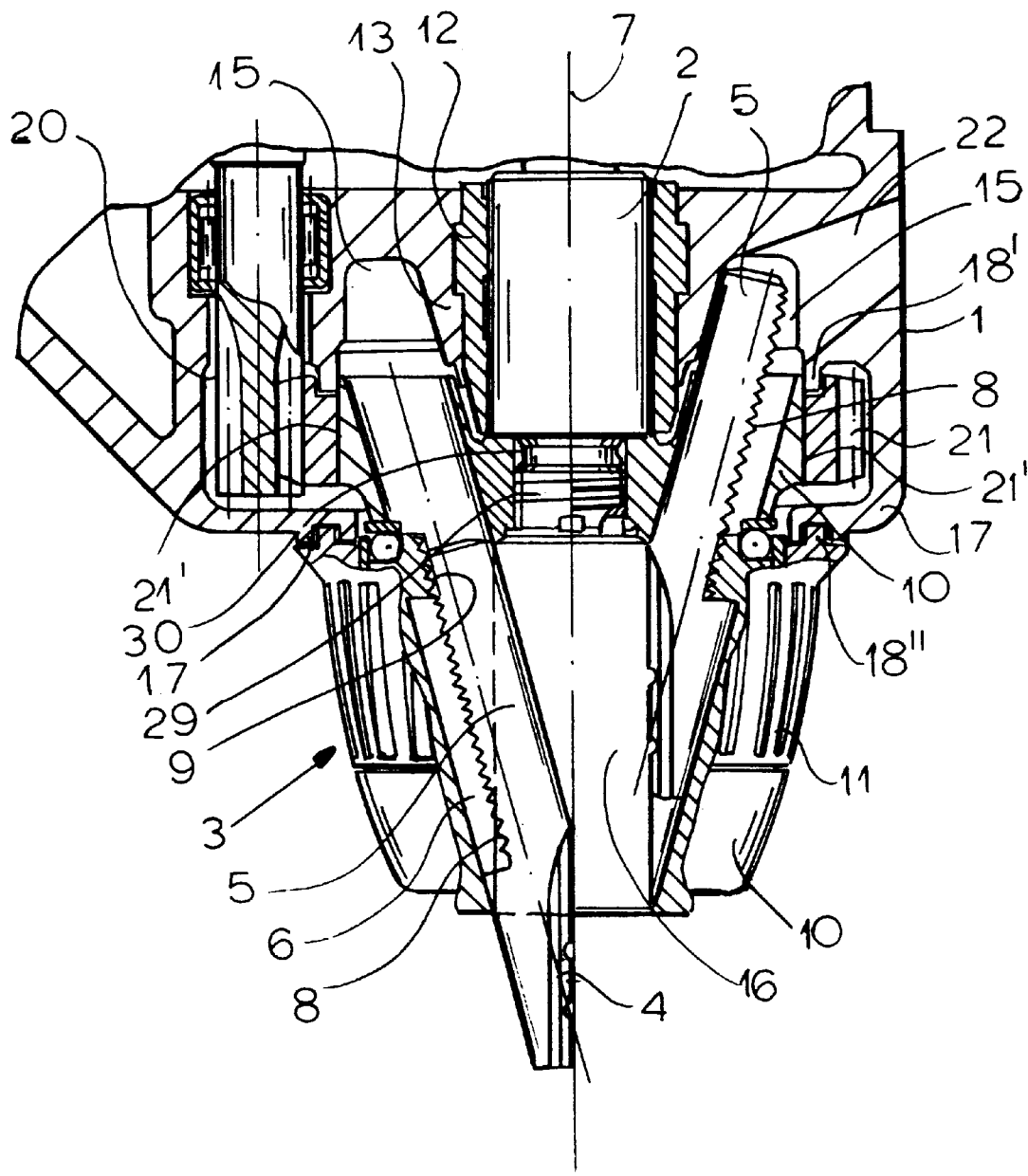

In FIG. 4 the chuck body 10 has a rear end 21' extending back into the housing 1 and fitted with a ring gear 21 directly meshing with the drive pinion 20. The housing 1 has an annular lip 18' received in a complementary groove in the rear of the gear 21' and the body 10 has a rearwardly projecting lip or rim 18" fitted to an annular groove in the housing 1.

Figure 5:
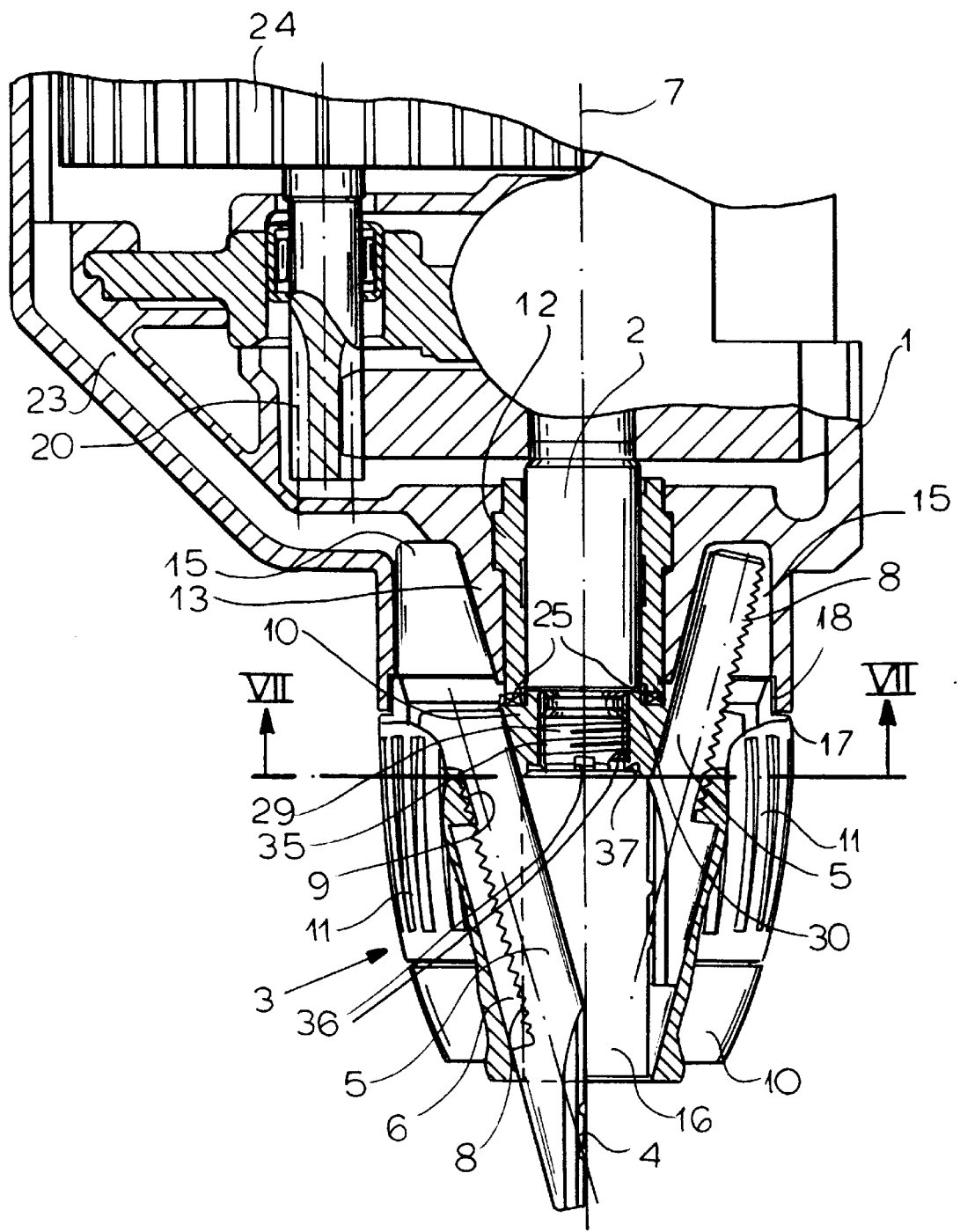
Figure 7:
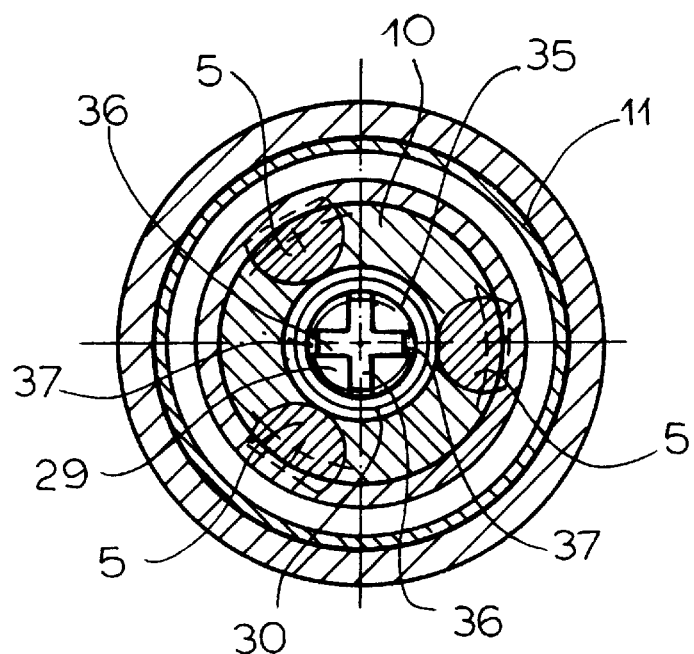
FIG. 7 is a cross section taken along line VII—VII of FIG. 5.
Figure 21:
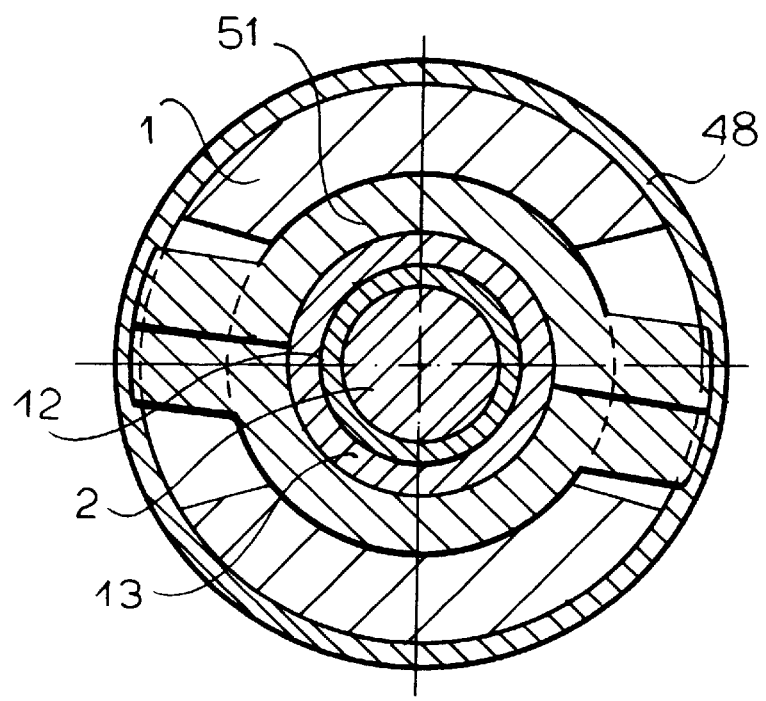
FIGS. 20 and 21 are cross sections taken along respective lines XX—XX and XXI—XXI of FIG. 18.

FIG. 5 shows a rim formation 17 that is not formed with vent holes 22; instead the housing 1 is formed with a vent passage 23 communicating with the chamber 15 and leading back to a fan 24 coaxial with the drive pinion 20. Depending on the direction of rotation, the fan impeller 24 can suck chips and the like back out of the chamber 25 or blow them forward therefrom. Here as also shown in FIG. 7 the front end 29 of the spindle 2 is formed with axially forwardly open and diametrally extending grooves 36 into which material 37 from the body 10 is engaged to angularly lock the body 10 on the spindle 2.

Figure 6E:
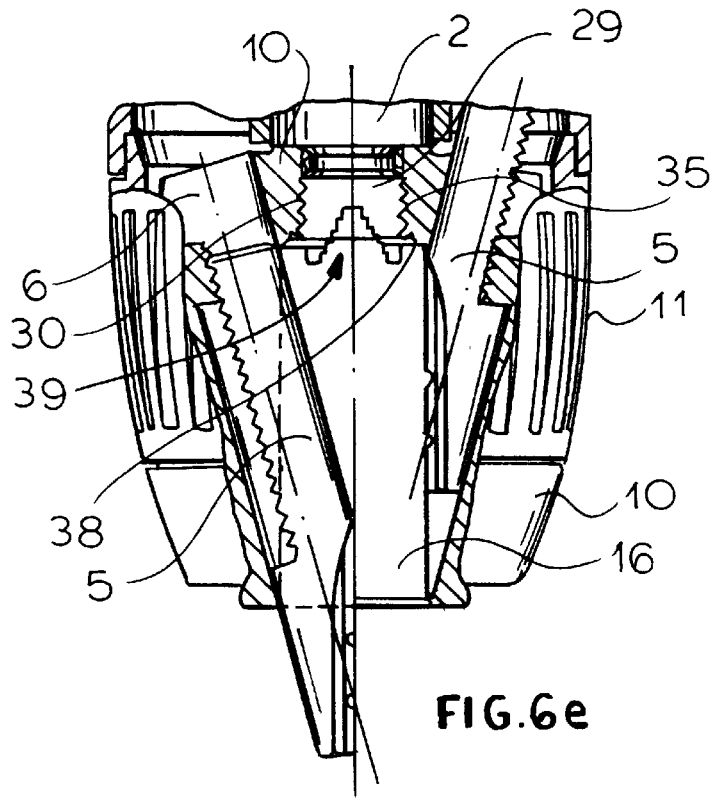
Figure 6F:
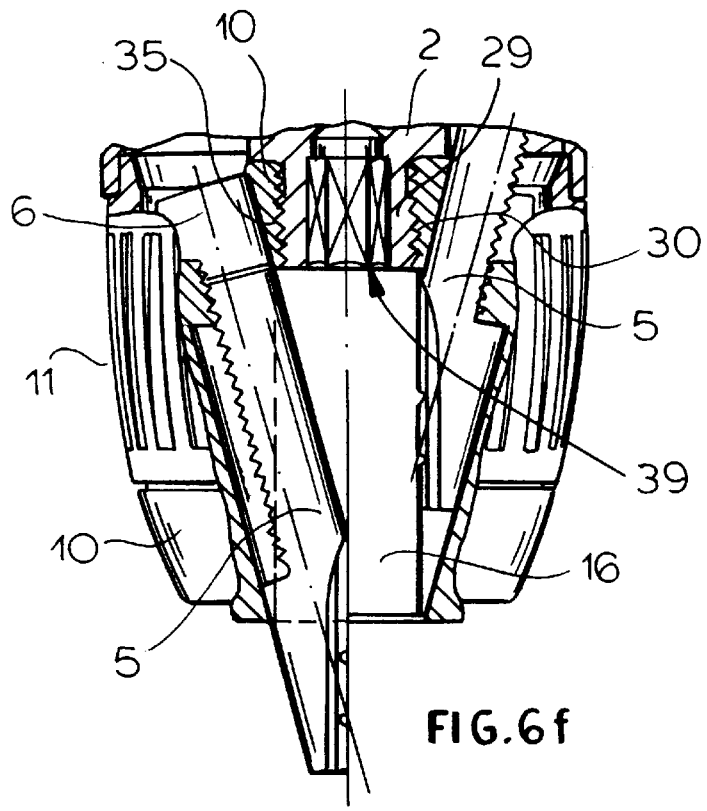

The front spindle end 29 is coupled to the chuck body 10 in FIG. 6a by providing an annular groove 31 in the seat 30 into which material 32 from the spindle 2 engages. FIGS. 6b and 6c show a snap ring 33 engaged on the end of the spindle 2 serving for such axial coupling while a key 34 effects angular coupling while still permitting some relative axial movement for hammer drilling. In FIG. 6d axial grooves 35 are partially filled with material 38 from the chuck body 11 to rotationally couple these parts. FIG. 6e shows a spindle 2 formed at its front end with a seat 39 for a tool and in FIG. 6f the seat 39 is shown to be hexagonal to actually complementarily receive a tool end and couple the unillustrated tool, e.g. a screwnail bit, directly to the spindle 2.

Figure 8:
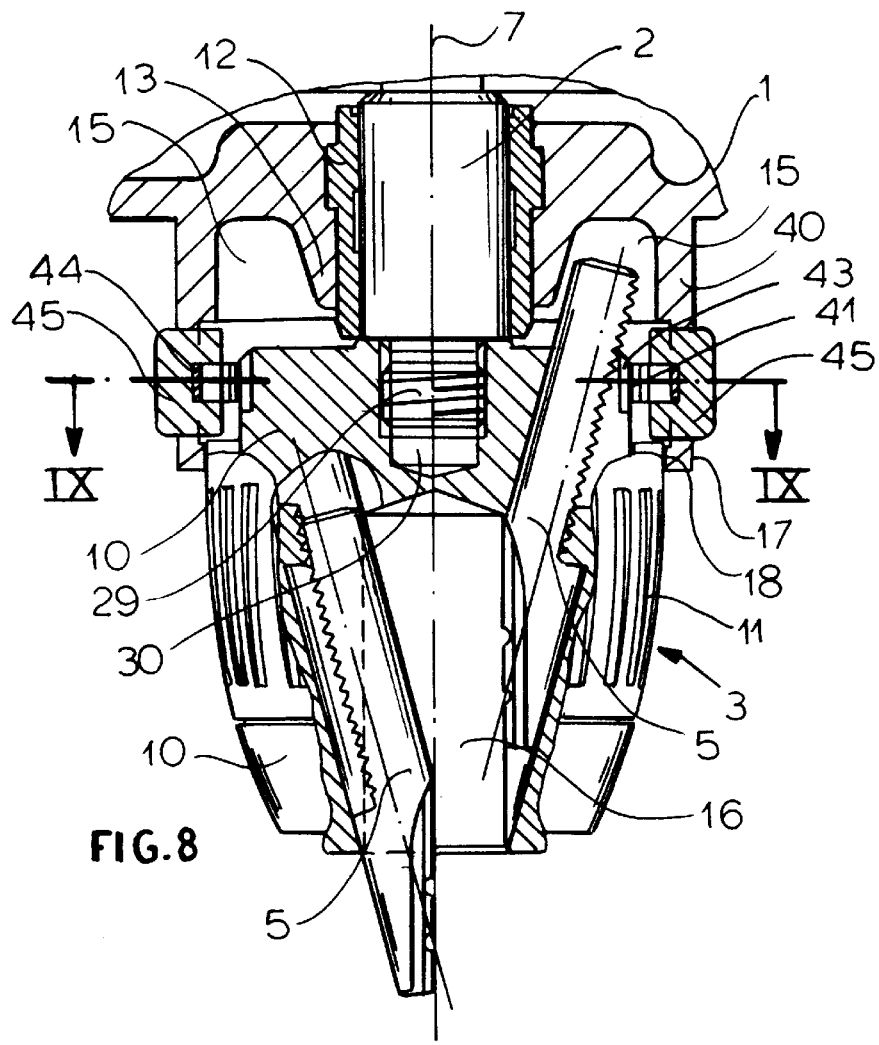
FIG. 8 is an axial section through yet another chuck.
Figure 9:
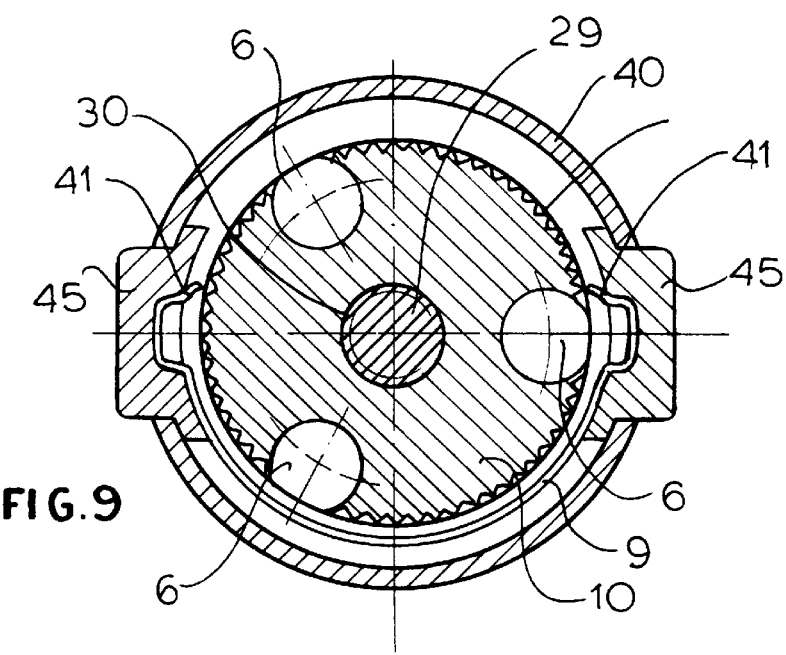
FIG. 9 is a cross section taken along line IX—IX of FIG. 8.

The chuck of FIGS. 8 and 9 has a collar 40 forming the chamber 15 and extending axially forward past and around the chuck body 10. Here a leaf spring 44 has engagement elements or ends 41 that can engage between teeth 42 formed on the body 10. The ends of this spring 44 are seated in diametrally opposite buttons 45 that project outward through windows in the collar 40. The user can therefore arrest the body 1 relative to the collar 40, which is fixed on the housing 1, simply by squeezing the buttons 45 so that the ends 41 engage between the teeth 42, thereby locking the two parts together for motor-assisted tightening or loosening. Since there are three angularly equispaced guides 6 and the two ends 41 are nearly diametrally opposite each other, even through these ends 41 are level with the rear ends of the guides 6 at any given time at least one of the ends 41 will be able to engage the teeth 42.

Figure 10:
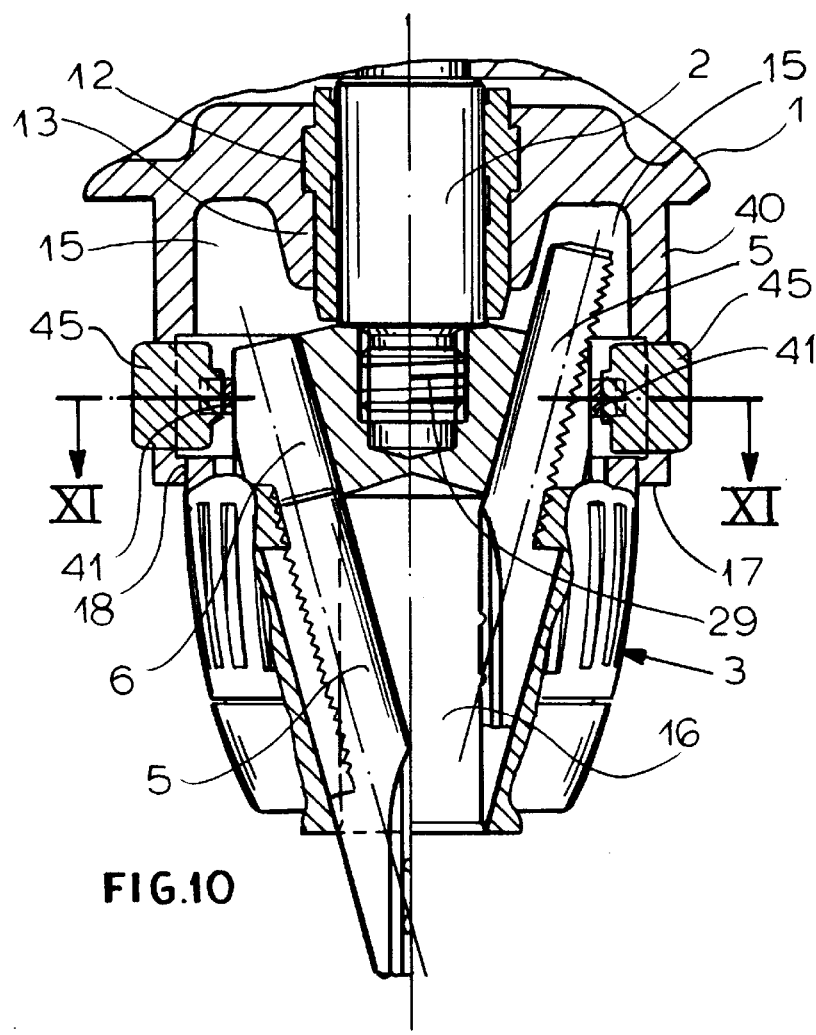
FIG. 10 is an axial section through yet another chuck.
Figure 11:
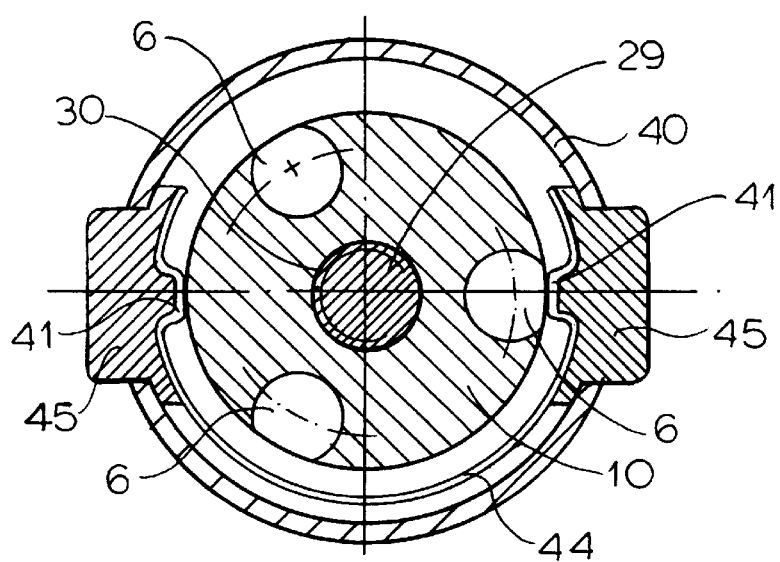
FIG. 11 is a cross section taken along line XI—XI of FIG. 10.

The system of FIGS. 10 and 11 is similar to that of FIGS. 8 and 9 except that the body 10 is not provided with teeth 42. Instead the engaging elements 41 of the spring 44 can engage in the open rear ends of the guides 6 to couple the collar 40 with the body 10.

Figure 12:
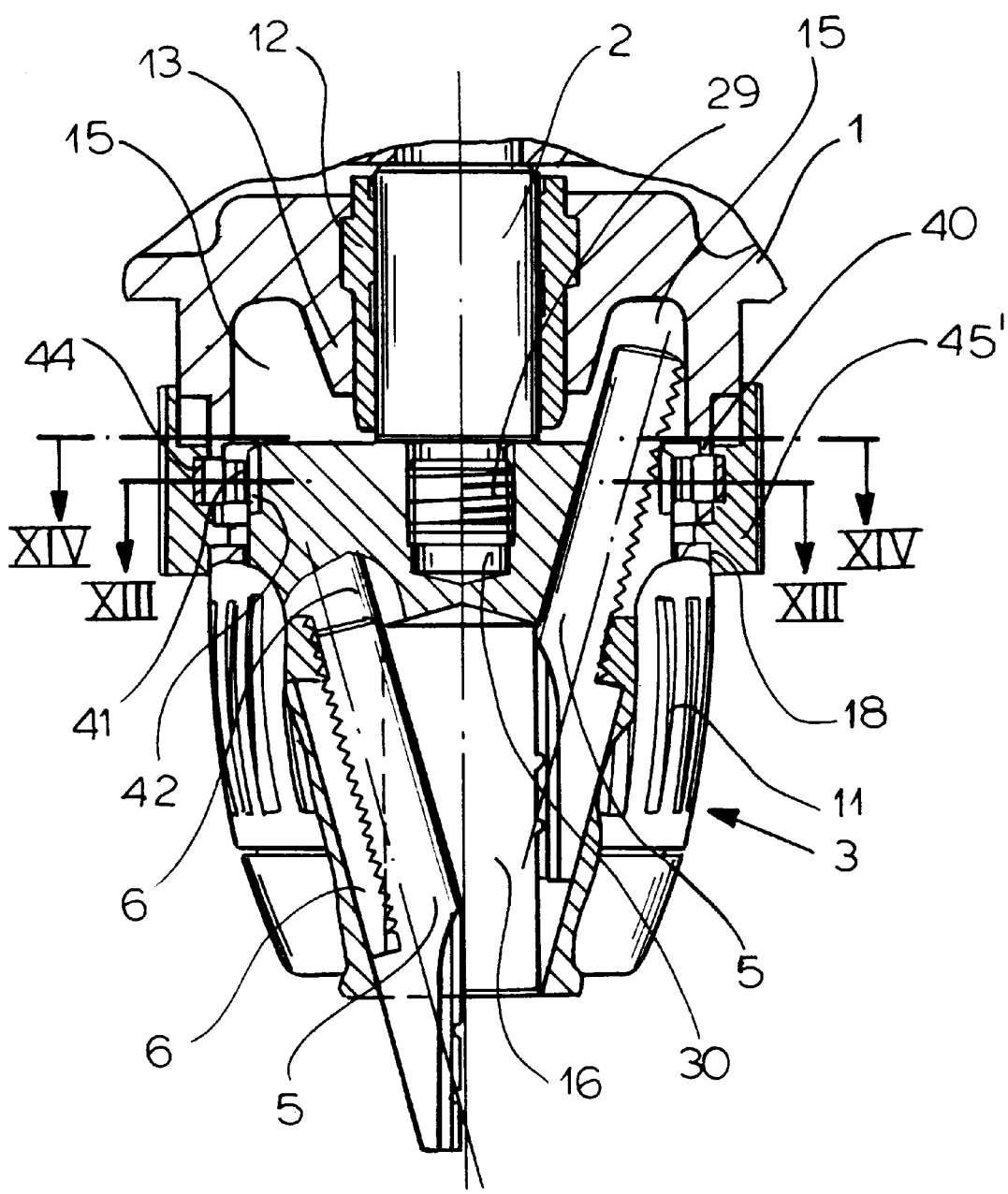
FIG. 12 is an axial section through yet another chuck.
Figure 13:
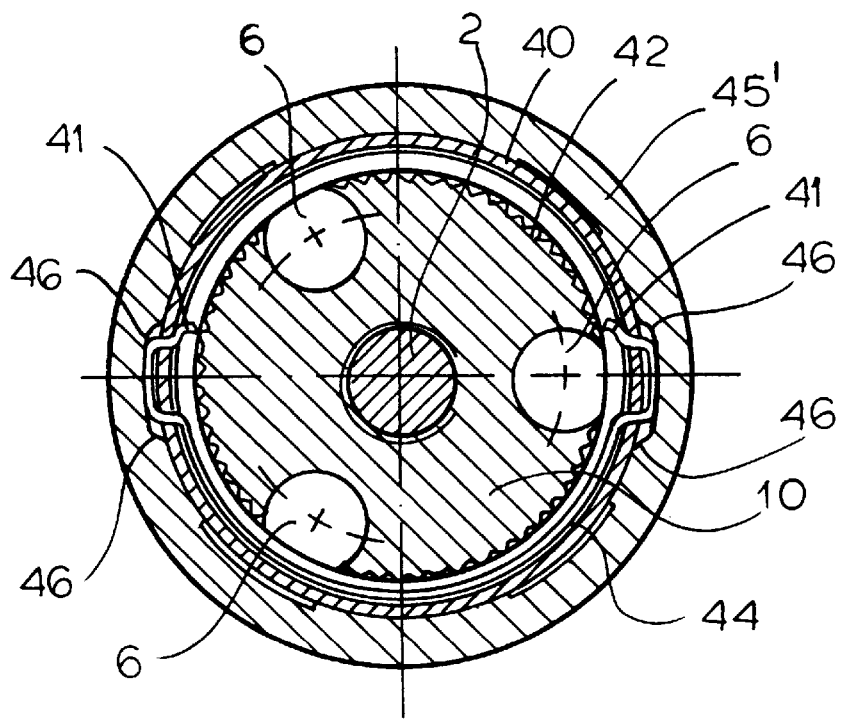
FIGS. 13, and 14 are cross sections taken along respective lines XIII—XIII and XIV—XIV of FIG. 12.
Figure 14:
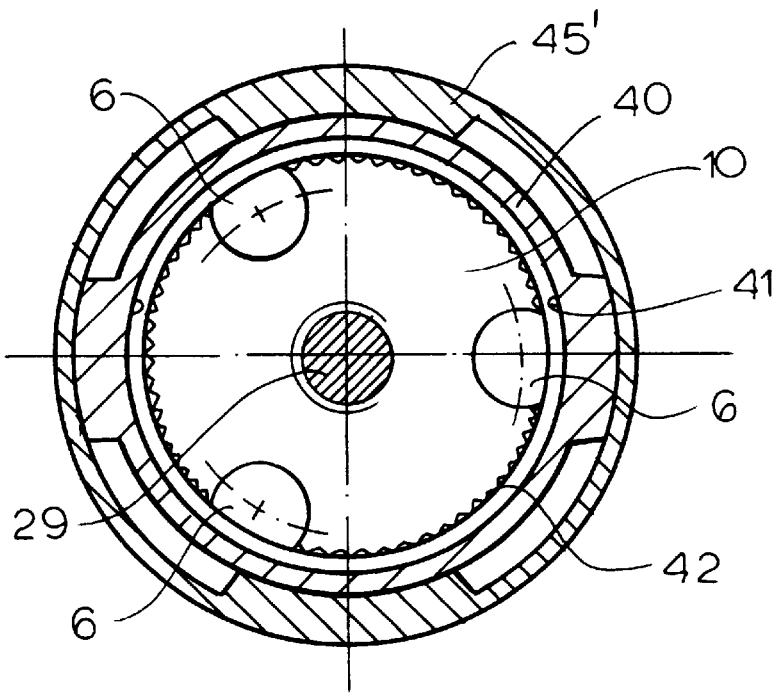

In FIGS. 12 through 14 the spring 44 is actuated by a rotary ring 45' having cam formations 46. When this ring 45' is moved to one end position, the cam formations 46 force the spring ends 41 in to engage with the teeth 42. In the opposite end position the natural elasticity of the spring 44 holds them out. The ring 45' is rotatable but axially nondisplaceable on the collar 40.

Figure 15:
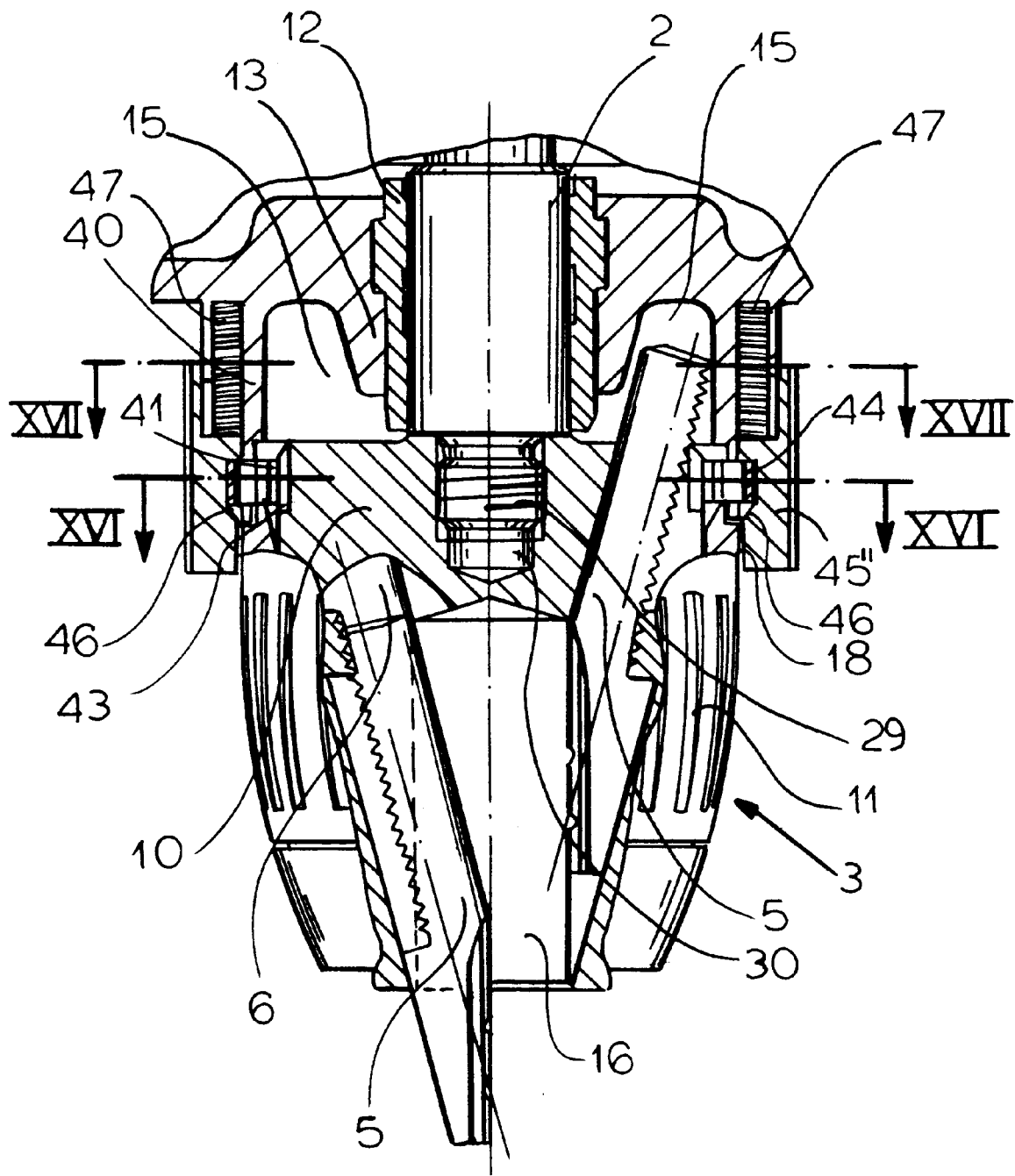
FIG. 15 is an axial section through yet another chuck.
Figure 16:
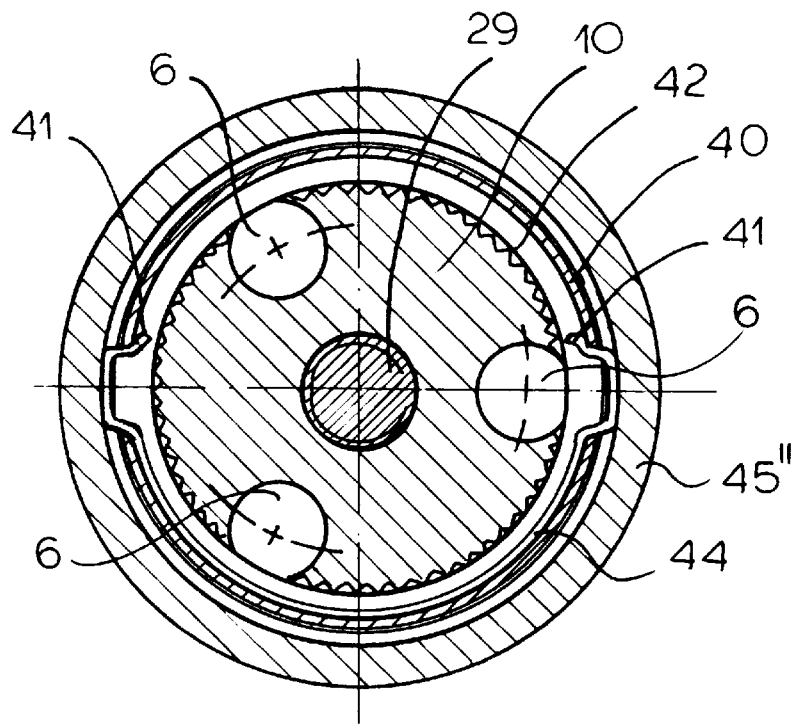
FIGS. 16 and 17 are cross sections taken along respective lines XVI—XVI and XVII—XVII of FIG. 15.
Figure 17:
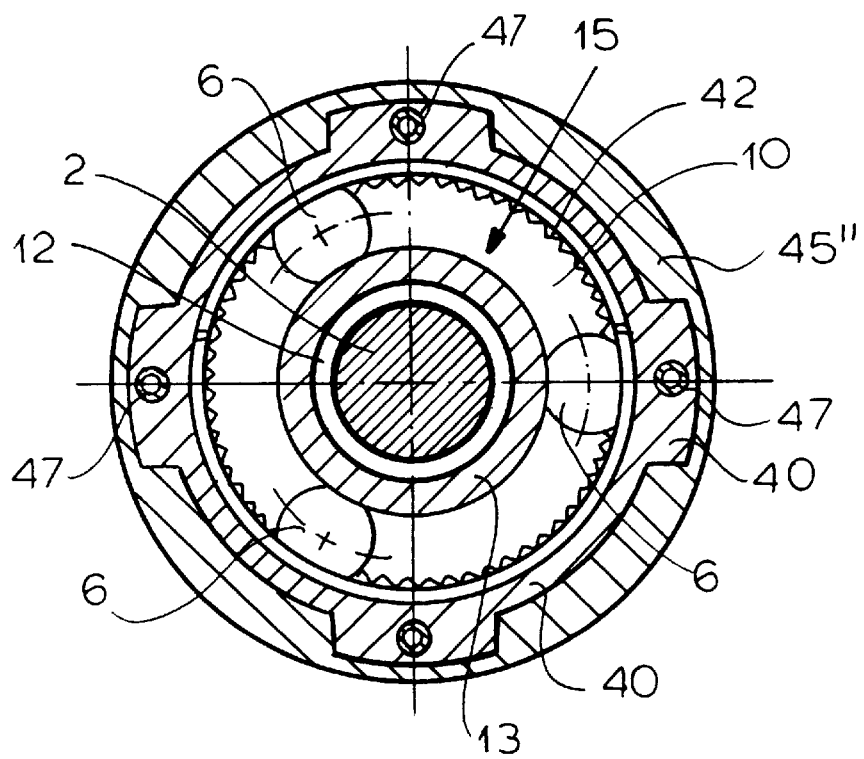
Figure 18:
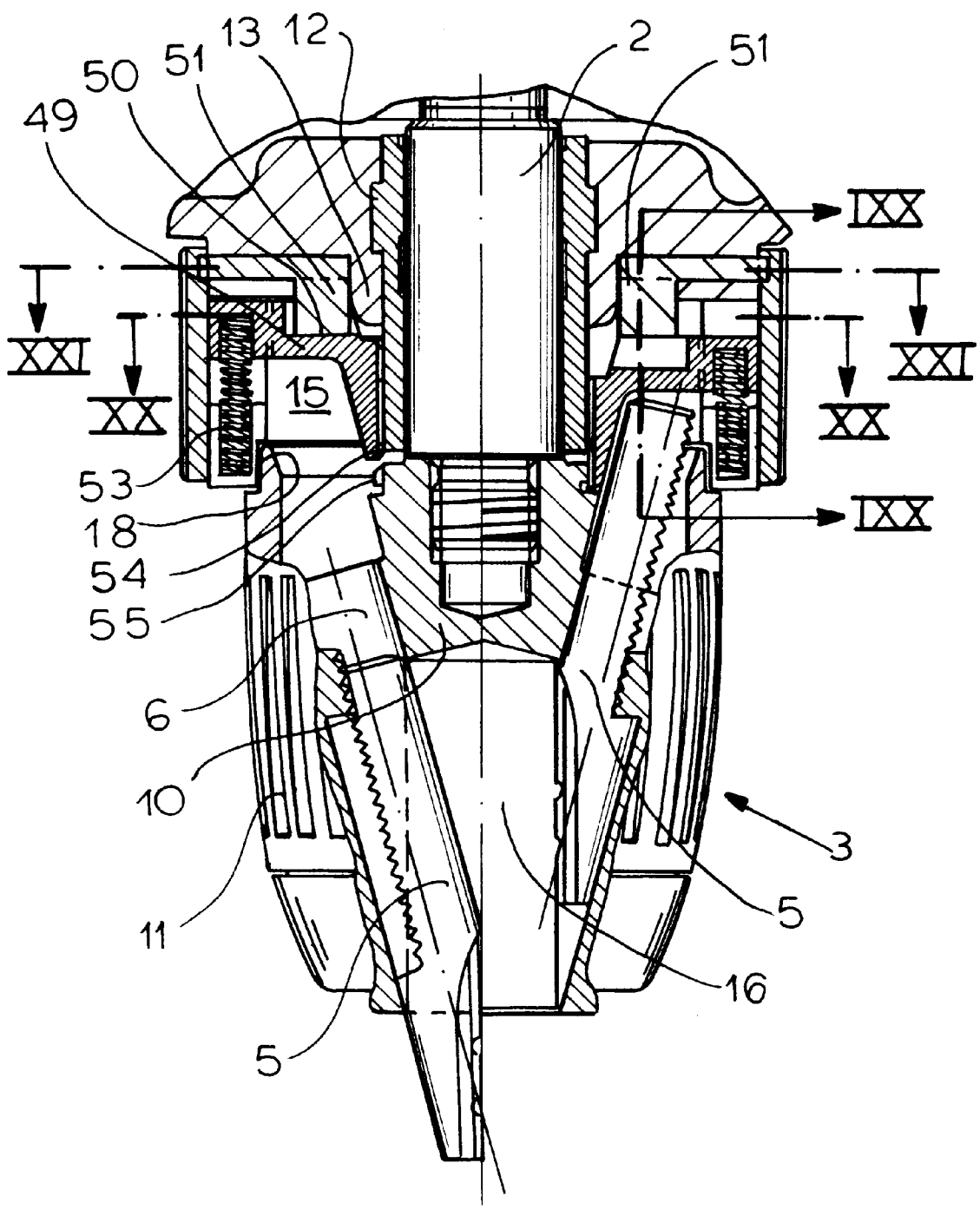
FIG. 18 is an axial section through yet another chuck.
Figure 19A:
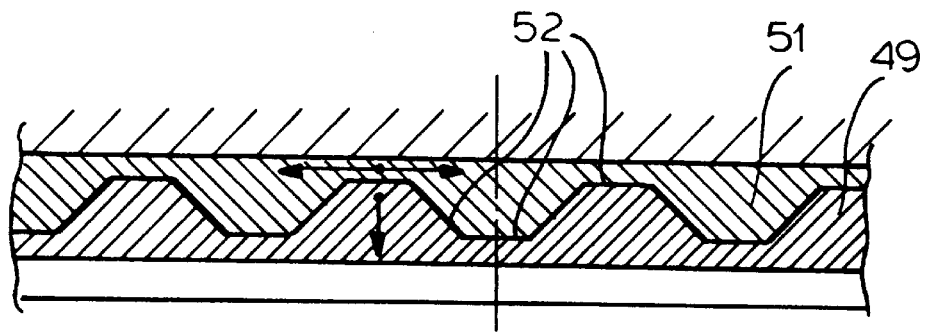
FIGS. 19a and 19b are sections taken along line XIX—XIX of FIG. 18 but with the parts in two different positions.
Figure 19B:
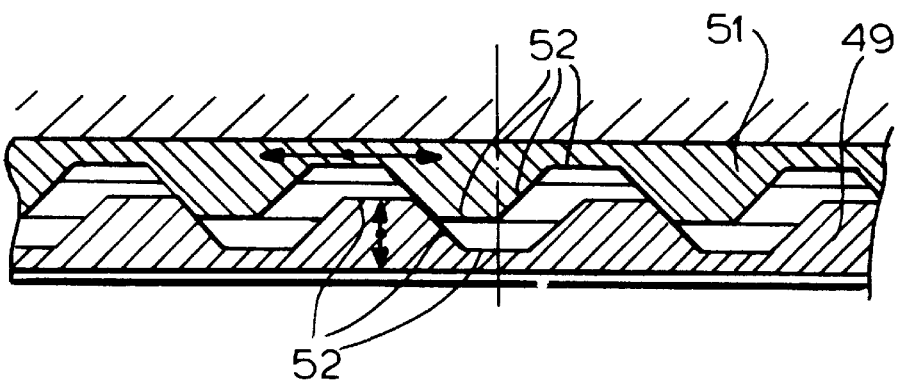
Figure 20:
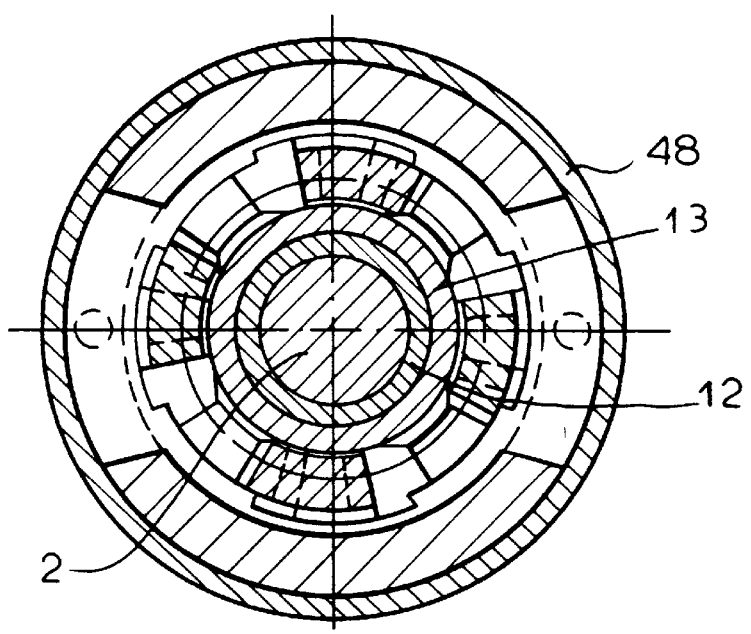

FIGS. 15 through 17 show another chuck where the spring 44 is actuated by an axially displaceable ring 45" that is urged forward by small compression springs 47 and that has an axially extending cam formation 46 that serves to push the spring 44 inward when the ring 45" is pulled back.

As seen in FIGS. 18 through 21 a locking ring 48 can rotate but not move axially on the chuck and carries an actuating ring 51 engaging via cam teeth 52 with an axially displaceable but nonrotatable ring 50. Springs 53 urge this ring 50 axially rearward into the position shown on the left in FIG. 18 while rotation of the ring 49 will cam it axially forward and cause teeth 54 formed on its inner periphery to mesh with teeth 55 formed on the outside of the body 10 to rotationally arrest the chuck body 10 and allow torque to be applied to it to chuck or dechuck a tool.

Figure 22:
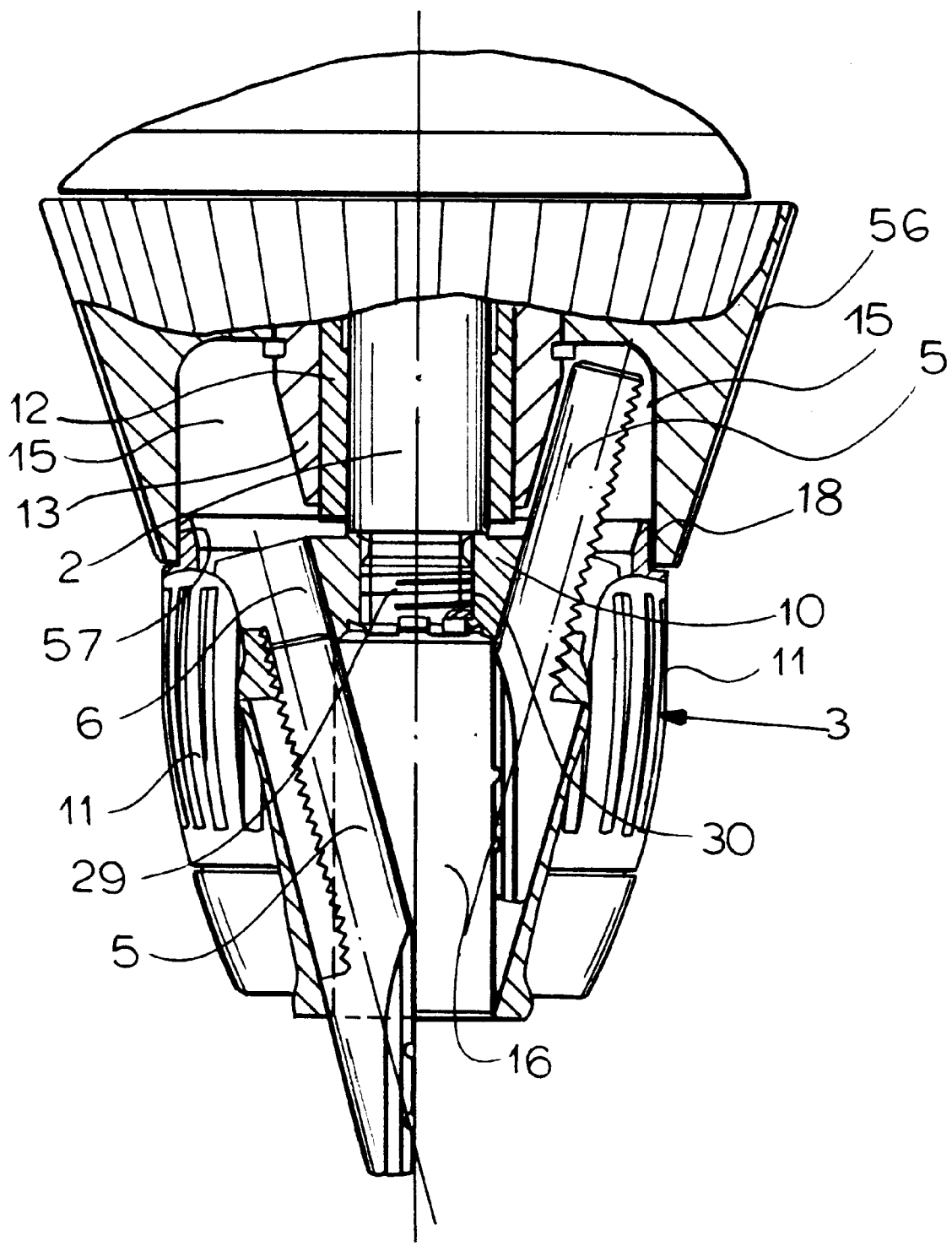
FIGS. 22 and 23 are axial sections through further chucks.

In FIG. 22 a ring 56 forming the chamber 15 can be rotated for controlling a clutch inside the housing 1 so that the torque can be controlled, for instance when using the device to drive screws.

Figure 23:
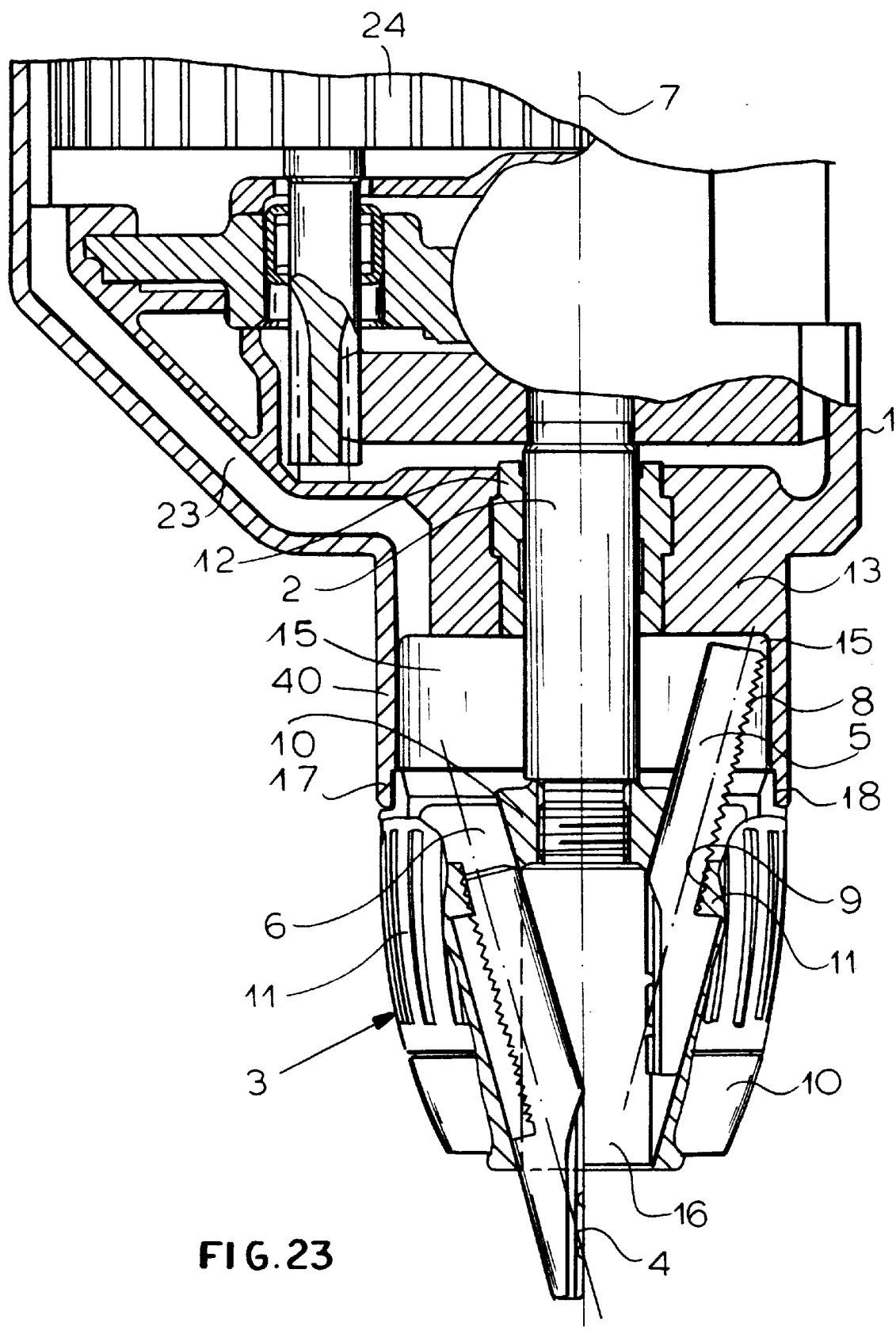

FIG. 23 shows another chuck assembly with a vent passage and a relatively long collar 40 engaging forward around the chuck body 10.

We claim:

1. A chuck comprising:
   a chuck body having a rear face and formed in the rear face centered on an axis with a rearwardly open internally threaded hole adapted to receive an externally threaded drill spindle and with a plurality of axially forwardly and axially rearwardly open guide passages, the chuck body lying wholly axially forward of the rear face;
   an adjustment ring axially fixed but rotatable about the axis on the chuck body and formed with an internal screwthread; and
   respective jaws displaceable in the passages between axially front and radially closely spaced positions and axially back and radially widely spaced positions and having teeth meshing with the screwthread, the jaws projecting in the back positions rearward from the chuck body axially rearward past the rear face, whereby rotation of the ring in a forward direction on the chuck body displaces the jaws axially forward and radially inward and opposite rotation of the ring in a reverse direction on the chuck body displaces the jaws axially rearward and radially apart.

2. The chuck defined in claim 1 wherein the hole is axially level with the passages.

3. The chuck defined in claim 2 wherein the hole extends axially forward of the adjustment ring.

4. The chuck defined in claim 3 wherein the screwthread of the ring engages the teeth of the jaws axially rearward of the rear face of the chuck body.

5. The chuck defined in claim 1 wherein the ring is formed with an annular and radially inwardly open groove and the body with an annular and radially outwardly projecting ridge fitted in the groove.

6. A chuck assembly comprising:
   a chuck element having a rear face and formed in the rear face centered on an axis with a rearwardly open hole adapted to receive an outer end of a drive spindle centered on and rotatable about the axis;
   a housing nonrotatable about the axis and forming an axially forwardly open annular chamber centered on the axis at the rear face of the chuck element;
   an adjustment ring element axially fixed but rotatable about the axis on the chuck element, one of the elements being formed with a plurality of axially forwardly open guide passages open axially rearward into the chamber and the other of the elements being formed with a screwthread centered on the axis, the elements both being rotatable about the axis relative to the housing; and
   respective jaws displaceable in the passages between axially front and radially closely spaced positions and axially back and radially widely spaced positions and having teeth meshing with the screwthread, whereby rotation of the ring element in a forward direction on the chuck element displaces the jaws axially forward and radially inward and opposite rotation of the ring element in a reverse direction on the chuck element displaces the jaws axially backward and radially apart, the jaws projecting rearward from the one element into the chamber in the back positions.

7. The chuck assembly defined in claim 6 wherein the housing is provided with a bearing rotatably supporting the spindle and projecting from the housing, the chamber radially surrounding the bearing.

8. The chuck assembly defined in claim 6 wherein the chamber is radially outwardly closed by the housing.

9. The chuck assembly defined in claim 6 wherein the spindle and the chuck element are unitary with each other.

10. The chuck assembly defined in claim 6 wherein the chuck element has a seat in which the spindle outer end is seated.

11. The chuck assembly defined in claim 10 wherein the outer end and the seat have complementary noncylindrical shapes.

12. The chuck assembly defined in claim 10 wherein the chuck element is formed between the jaws with an axially forwardly open tool-receiving recess and the spindle outer end engages into the recess.

13. The chuck assembly defined in claim 10 wherein the spindle outer end and the chuck element have interengaging formations that angularly couple them together.

14. A chuck assembly comprising:
   a chuck element fixed on an outer end of a drive spindle centered on and rotatable about an axis;
   a housing provided with a bearing projecting from the housing and rotatably supporting the spindle, the housing forming an annular chamber around the bearing and around a rear end of the chuck element;
   an adjustment ring element axially fixed but rotatable about the axis on the chuck element, one of the elements being formed with a plurality of axially forwardly open guide passages open axially rearward into the chamber and the other of the elements being formed with a screwthread centered on the axis, the elements both being rotatable about the axis relative to the housing; and
   respective jaws displaceable in the passages between axially front and radially closely spaced positions and axially back and radially widely spaced positions and having teeth meshing with the screwthread, whereby rotation of the ring element in a forward direction on the chuck element displaces the jaws axially forward and radially inward and opposite rotation of the ring element in a reverse direction on the chuck element displaces the jaws axially backward and radially apart, the jaws projecting rearward from the one element into the chamber in the back positions.

15. A chuck assembly comprising:
   a chuck element fixed on and unitary with an outer end of a drive spindle centered on and rotatable about an axis;
   a housing forming an annular chamber around a rear end of the chuck element;
   an adjustment ring element axially fixed but rotatable about the axis on the chuck element, one of the elements being formed with a plurality of axially forwardly open guide passages open axially rearward into the chamber and the other of the elements being formed with a screwthread centered on the axis, the elements both being rotatable about the axis relative to the housing; and respective jaws displaceable in the passages between axially front and radially closely spaced positions and axially back and radially widely spaced positions and having teeth meshing with the screwthread, whereby rotation of the ring element in a forward direction on the chuck element displaces the jaws axially forward and radially inward and opposite rotation of the ring element in a reverse direction on the chuck element displaces the jaws axially backward and radially apart, the jaws projecting rearward from the one element into the chamber in the back positions.

16. A chuck assembly comprising:

a chuck element fixed on and having a seat in which is seated an outer end of a drive spindle centered on and rotatable about an axis, the spindle outer end and chuck element having interengaging formations that angularly couple them together;

a housing forming an annular chamber around a rear end of the chuck element;

an adjustment ring element axially fixed but rotatable about the axis on the chuck element, one of the elements being formed with a plurality of axially forwardly open guide passages open axially rearward into the chamber and the other of the elements being formed with a screwthread centered on the axis, the elements both being rotatable about the axis relative to the housing; and respective jaws displaceable in the passages between axially front and radially closely spaced positions and axially back and radially widely spaced positions and having teeth meshing with the screwthread, whereby rotation of the ring element in a forward direction on the chuck element displaces the jaws axially forward and radially inward and opposite rotation of the ring element in a reverse direction on the chuck element displaces the jaws axially backward and radially apart, the jaws projecting rearward from the one element into the chamber in the back positions.

* * * * *